United States Patent
Waseda (10) Patent No.: US 11,909,003 B2
(45) Date of Patent: Feb. 20, 2024

(54) ALL-SOLID-STATE BATTERY AND PRODUCTION METHOD THEREFOR

(71) Applicant: TOYOTA JIDOSHA KABUSHIKI KAISHA, Toyota (JP)

(72) Inventor: Tetsuya Waseda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 17/551,784

(22) Filed: Dec. 15, 2021

(65) Prior Publication Data
US 2022/0109192 A1   Apr. 7, 2022

Related U.S. Application Data (62) Division of application No. 16/524,431, filed on Jul. 29, 2019, now abandoned.

(30) Foreign Application Priority Data

Jul. 30, 2018 (JP) ................................ 2018-142443

(51) Int. Cl.
*H01M 10/0585* (2010.01)
*H01M 10/0525* (2010.01)
(Continued)

(52) U.S. Cl.
CPC ....... *H01M 10/0585* (2013.01); *H01M 4/386* (2013.01); *H01M 10/0525* (2013.01);
(Continued)

(58) Field of Classification Search
CPC ............. H01M 10/0585; H01M 4/386; H01M 10/0525; H01M 10/0562; H01M 10/0468;
(Continued)

(56) References Cited

U.S. PATENT DOCUMENTS

| 2004/0253512 A1* | 12/2004 | Watanabe | H01M 4/131 |
| | | | 429/185 |
| 2011/0076550 A1* | 3/2011 | Liang | H01M 50/193 |
| | | | 29/623.2 |

(Continued)

FOREIGN PATENT DOCUMENTS

| BR | PI0614743 A2 * | 4/2011 | ............. G01N 21/31 |
| CN | 107452985 A | 12/2017 | |

(Continued)

OTHER PUBLICATIONS

Cheng et al., Elastic properties of lithium cobalt oxide (LiCoO2), Mar. 16, 2017, Journal of Asian Ceramic Societies 5 (2017) 113-117. [online] journal homepage: www.elsevier.com/locate/jascer (Year: 2017).*

(Continued)

*Primary Examiner* — Brittany L Raymond
(74) *Attorney, Agent, or Firm* — Sughrue Mion, PLLC (57) ABSTRACT

An all-solid-state battery including a cell laminate including two or more unit cells, and a resin layer covering a side surface of the cell laminate, wherein each unit cell includes a positive electrode current collector layer, a positive electrode active material layer, a solid electrolyte layer, a negative electrode active material layer, and a negative electrode current collector layer laminated in this order, at least one of the positive electrode current collector layer, positive electrode active material layer, solid electrolyte layer, negative electrode active material layer, and negative electrode current collector layer includes extending parts which extend more outwardly from the side surface of the cell laminate than the other layers, and gaps are formed between the extending parts, and the ratio of the compressive modulus of the resin layer to the compressive modulus of the cell laminate is 0.4 or less.

6 Claims, 2 Drawing Sheets

(51) Int. Cl.
*H01M 4/38* (2006.01)
*H01M 10/0562* (2010.01)

(52) U.S. Cl.
CPC ......... *H01M 10/0562* (2013.01); *Y02E 60/10* (2013.01); *Y02P 70/50* (2015.11)

(58) Field of Classification Search
CPC .. H01M 2300/0065; Y02E 60/10; Y02P 70/50
See application file for complete search history.

(56) References Cited

U.S. PATENT DOCUMENTS

| | | |
|---|---|---|
| 2015/0303450 A1 | 10/2015 | Miki |
| 2015/0303464 A1 | 10/2015 | Watanabe et al. |
| 2015/0333376 A1 | 11/2015 | Gaben |
| 2016/0079625 A1 | 3/2016 | Shon |
| 2017/0352923 A1 | 12/2017 | Iwano et al. |
| 2018/0166735 A1 | 6/2018 | Busacca et al. |
| 2018/0358592 A1 | 12/2018 | Park |
| 2019/0288246 A1* | 9/2019 | Kato ................... H01M 50/548 |
| 2020/0036044 A1 | 1/2020 | Waseda |

FOREIGN PATENT DOCUMENTS

| | | | |
|---|---|---|---|
| JP | 2000-106154 A | 4/2000 | |
| JP | 5228540 B2 * | 7/2013 | |
| JP | 2017-220447 A | 12/2017 | |
| KR | 2004-0107372 | * 12/2004 | |
| WO | WO-2017112550 A1 * | 6/2017 | ............. G01N 21/31 |
| WO | WO-2018037709 A1 * | 3/2018 | ............ H01M 10/04 |
| WO | WO 2018-123319 | * 7/2018 | |

OTHER PUBLICATIONS

U.S. Appl. No. 16/185,153, filed Nov. 9, 2018 to Tetsuya Waseda.
U.S. Appl. No. 16/292,730, filed Mar. 5, 2019 to Tetsuya Waseda.
Non-Final Office Action dated Mar. 31, 2022 issued in U.S. Appl. No. 16/524,431.

* cited by examiner

ALL-SOLID-STATE BATTERY AND PRODUCTION METHOD THEREFOR

CROSS-REFERENCE

This is a divisional of application Ser. No. 16/524,431, filed Jul. 29, 2019, which claims priority to Japanese Patent Application No. 2018-142443, filed Jul. 30, 2018, the entire contents of which are incorporated herein by reference

FIELD

The present disclosure relates to an all-solid-state battery and a production method therefor. In particular, the present disclosure relates to an all-solid-state battery comprising a cell laminate and a resin layer covering the cell laminate, as well as a production method therefor.

BACKGROUND

In recent years, various technologies for sealing batteries using a resin have been disclosed.

For example, Patent Literature 1 discloses a technology in which an all-solid-state battery element is covered with an exterior body consisting of a thermosetting resin or a thermoplastic resin.

Conventionally, an all-solid-state batteries comprises a cell laminate including one or more unit cells, and each unit cell comprises a positive electrode current collector layer, a positive electrode active material layer, a solid electrolyte layer, a negative electrode active material layer, and a negative electrode current collector layer laminated in this order. Furthermore, conventionally, in cell laminates, at least one of the positive electrode current collector layer, positive electrode active material layer, solid electrolyte layer, negative electrode active material layer, and negative electrode current collector layer comprises extending parts which extend more outwardly than the other layers, and a gap is formed between the extending parts in the side surface of the cell laminate.

Various techniques have been developed to reliably embed resin in such gap when the side surface of a cell laminate having the gap in the side surface is covered with a resin layer.

For example, Patent Literature 2 discloses a technology for producing an all-solid-state battery which is covered with a resin layer by supplying a liquid resin to the gaps and curing the resin between extending parts in the side surface of the cell laminate in which the gaps are formed.

CITATION LIST

Patent Literature

[PTL 1] Japanese Unexamined Patent Publication (Kokai) No. 2000-106154
[PTL 2] Japanese Unexamined Patent Publication (Kokai) No. 2017-220447

SUMMARY

Technical Problem

In order to produce an all-solid-state battery by covering, with a resin layer, the side surface of a cell laminate having gaps between extending parts in the side surface as described above, in general, the following steps are performed.

First, a cell laminate having gaps between extending parts in the side surface thereof is formed. Next, the side surface of the cell laminate (including the gaps in the side surface) is covered with a resin layer. Thereafter the cell laminate is restrained in the lamination direction, whereby an all-solid-state battery is produced.

However, when the cell laminate is restrained in the lamination direction while the side surface of the cell laminate is covered with the resin layer, deformation of the extending parts in the side surface of the cell laminate may occur due to the stress imparted by the resin layer. This deformation and changes in volume of the cell laminate generated during charging and discharging overlap, whereby cracking of the extending parts of the cell laminate and the resin layer may occur.

Thus, in light of the above circumstances, the present disclosure aims to provide an all-solid-state battery in which cracking of the extending parts of the cell laminate and the resin layer caused by deformation of the extending parts on the side surface of the cell laminate and changes in volume of the cell laminate can be suppressed, and a production method therefor.

Solution to Problem

The present inventor has discovered that the above problems can be solved by the following means.

<Aspect 1>
An all-solid-state battery comprising:
  a cell laminate including two or more unit cells, and
  a resin layer covering a side surface of the cell laminate,
  wherein each unit cell comprises a positive electrode current collector layer, a positive electrode active material layer, a solid electrolyte layer, a negative electrode active material layer, and a negative electrode current collector layer laminated in this order,
  wherein at least one of the positive electrode current collector layer, positive electrode active material layer, solid electrolyte layer, negative electrode active material layer, and negative electrode current collector layer includes extending parts which extend more outwardly from the side surface of the cell laminate than the other layers, and a gap is formed between the extending parts, and
  wherein the ratio of the compressive modulus of the resin layer to the compressive modulus of the cell laminate is 0.4 or less.

<Aspect 2>
The all-solid-state battery according to Aspect 1, wherein the negative electrode active material layer comprises an alloy-based negative electrode active material.

<Aspect 3>
The all-solid-state battery according to Aspect 2, wherein the alloy-based negative electrode active material comprises a Si alloy-based negative electrode active material.

<Aspect 4>
The all-solid-state battery according to any one of Aspects 1 to 3, wherein the material of the resin layer comprises a curable resin or a thermoplastic resin.

<Aspect 5>
The all-solid-state battery according to any one of Aspects 1 to 4, wherein the all-solid-state battery is an all-solid-state lithium secondary battery.

<Aspect 6>

The all-solid-state battery according to any one of Aspects 1 to 5, wherein the cell laminate is restrained in the lamination direction.

<Aspect 7>

The all-solid-state battery according to Aspect 6, wherein a restraint pressure of the restraint is 1.0 MPa or more.

<Aspect 8>

A method for producing the all-solid-state battery according to Aspect 6 or Aspect 7, comprising the following steps of:

(a) preparing the cell laminate,
(b) forming the resin layer on the side surface of the cell laminate, and
(c) restraining the cell laminate, which has been covered with the resin layer, in the lamination direction.

Advantageous Effects of Invention

According to the present disclosure, in an all-solid-state battery comprising a cell laminate having a side surface covered with a resin layer, cracking of extending parts of the cell laminate and the resin layer caused by deformation of the extending parts on the side surface of the cell laminate and changes in volume of the cell laminate can be suppressed.

DESCRIPTION OF EMBODIMENTS

The embodiments of the present disclosure will be described in detail below while referring to the drawings. For convenience of explanation, in the drawings, identical components are assigned the same reference numerals, and duplicate explanations therefor have been omitted. Not all of the constituent elements of the embodiments are necessarily indispensable, and some of the constituent elements may be omitted in some cases. The aspects shown in the drawings below are merely examples of the present disclosure, and do not limit the present disclosure.

<<All-Solid-State Battery>>

The all-solid-state battery of the present disclosure comprises:

a cell laminate including two or more unit cells, and
a resin layer covering a side surface of the cell laminate,
wherein each unit cell comprises a positive electrode current collector layer, a positive electrode active material layer, a solid electrolyte layer, a negative electrode active material layer, and a negative electrode current collector layer laminated in this order,
wherein at least one of the positive electrode current collector layer, positive electrode active material layer, solid electrolyte layer, negative electrode active material layer, and negative electrode current collector layer includes extending parts which extend more outwardly from the side surface of the cell laminate than the other layers, and a gap is formed between the extending parts, and wherein the ratio of the compressive modulus of the resin layer to the compressive modulus of the cell laminate is 0.4 or less.

Figure 1:
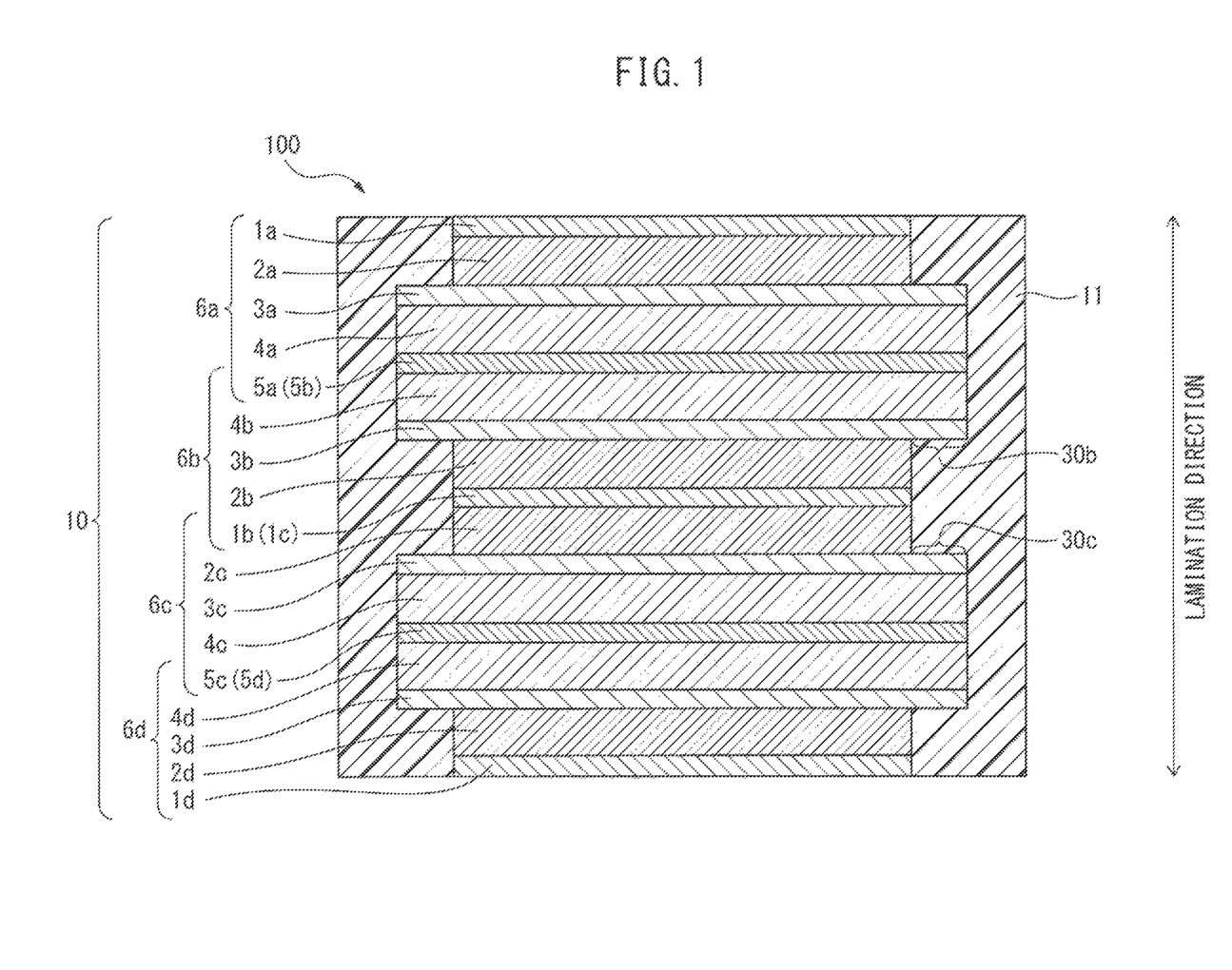
FIG. 1 is a schematic cross-sectional view showing an example of the all-solid-state battery of the present disclosure.

FIG. 1 is a schematic cross-sectional view showing an example of the all-solid-state battery of the present disclosure. The all-solid-state battery 100 comprises a cell laminate 10 having four unit cells 6a, 6b, 6c, and 6d, and a resin layer 11. The resin layer 11 covers the side surface of the cell laminate 10.

In the all-solid-state battery 100 shown in FIG. 1, the solid electrolyte layers 3a to 3d, the negative electrode active material layers 4a to 4d, and the negative electrode current collector layers 5a to 5d each comprise extending parts 30b and 30c which extend more outwardly from the side surface of the cell laminate 10 than the other layers, specifically the positive electrode active material layers 2a to 2d and the positive electrode current collector layers 1a to 1d, and a gap is formed between the extending parts 30b and 30c. The resin layer 11 also covers this gap. Furthermore, the ratio of the compressive modulus of the resin layer 11 to the compressive modulus of the cell laminate 10 is 0.4 or less (i.e., compressive modulus of resin layer 11/compressive modulus of cell laminate 10≤0.4).

As described above, conventionally, when producing an all-solid-state battery which is covered with a resin layer, by restraining the battery in the lamination direction, deformation of the extending parts of the cell laminate in the side surface of the cell laminate can occur. This deformation, along with changes in volume of the cell laminate due to charging and discharging, can cause cracking in the extending parts of the cell laminate and in the resin layer.

In connection thereto, as a result of rigorous investigation, the present inventor has discovered that by limiting the ratio of the compressive modulus of the resin layer to the compressive modulus of the cell laminate to 0.4 or less, cracking of the extending parts of the cell laminate and the resin layer can be suppressed. More specifically, by limiting the ratio of the compressive modulus of the resin layer to the compressive modulus of the cell laminate to 0.4 or less, when the cell laminate is retrained in the lamination direction, the occurrence of deformation of the extending parts of the cell laminate due to the stress imparted by the resin layer can be suppressed, and as a result, when changes in volume of the cell laminate due to charging and discharging occur, the risk of the occurrence of cracking of the extending parts of the cell laminate and the resin layer can be reduced.

Furthermore, by controlling the ratio of the compressive modulus of the resin layer to the compressive modulus of the cell laminate to within the specific range shown in the present disclosure, even if a cell laminate in which the side surface is covered with a resin layer is restrained in the lamination direction, the occurrence of deformation of the extending parts of the cell laminate can be suppressed, and as a result, when changes in volume of the cell laminate due to charging and discharging occur, the risk of the occurrence of cracking of the extending parts of the cell laminate and the resin layer can be reduced. In other words, in the case in which a cell laminate in which the side surface is covered with a resin layer is restrained in the lamination direction, the effect of the present disclosure can be more remarkably obtained.

In the present disclosure, the compressive modulus of the cell laminate is the compressive modulus of the cell laminate after formation, i.e., the compressive modulus of the cell laminate in a state prior to being covered with the resin layer. Furthermore, the compressive modulus of the cell laminate can be obtained in accordance with the JIS standards (JIS R1644:2002). More specifically, a sample of a formed cell laminate is set in a compressive modulus measurement device, and the amount of displacement of the set measurement sample when a pressure of 0 to 5 MPa is applied in the direction of lamination of the cell laminate (lamination direction) is measured under normal temperature (23° C.) and normal humidity (50% RH) conditions. Further, the compressive modulus of the cell laminate can be calculated from the slope of the pressure in the range where the amount of deformation is 5% or less.

Furthermore, in the present disclosure, the compressive modulus of the resin layer can be measured in accordance with the JIS standards (JIS A9511:1999). More specifically, a rectangular solid test piece having a length of 100 mm, a width of 100 mm, and a thickness of 30 mm is produced using the resin constituting the resin layer formed on the side surface of the cell laminate, and thereafter, measurement of the compressive modulus of this test piece is performed using a Tensilon measurement device at a compression rate of 10 mm/min. Five test pieces are prepared, the compressive moduli of these test pieces are measured as described above under normal temperature (23° C.) and normal humidity (50% RH) conditions, and the value of the arithmetic average thereof is used as the compressive modulus of the resin layer.

Furthermore, in the present disclosure, it is only necessary that the ratio of the compressive modulus of the resin layer to the compressive modulus of the cell laminate (compressive modulus of resin layer/compressive modulus of cell laminate) be 0.4 or less, and the ratio of the compressive modulus of the resin layer to the compressive modulus of the cell laminate may be, for example, 0.35 or less, 0.3 or less, 0.25 or less, 0.2 or less, 0.15 or less, 0.10 or less, 1.0 or less, 0.08 or less, 0.05 or less, or 0.02 or less. The lower limit of the ratio of the compressive modulus of the resin layer to the compressive modulus of the cell laminate is not particularly limited and may be, for example, greater than 0.01.

Furthermore, in the present disclosure, the specific values of the compressive modulus of the cell laminate and the compressive modulus of the resin layer are not particularly limited. The compressive modulus of a provided cell laminate varies depending on the number of laminates of the cell laminate and/or the types of the constituent materials of the layers, which are set in accordance with purpose and application. Likewise, the compressive modulus of the formed resin layer varies depending on the type of material constituting the resin layer.

Furthermore, in order to limit the ratio of the compressive modulus of the resin layer to the compressive modulus of the cell laminate to 0.4 or less, for example, the compressive modulus of the resin layer can be appropriately changed in accordance with the compressive modulus of the provided cell laminate. In order to change the compressive modulus of the resin layer, the type of resin may be changed, an appropriate filler may be added to the material constituting the resin layer, or the amount of added filler may be adjusted.

<Cell Laminate>

In the present disclosure, the cell laminate comprises two or more unit cells, and each unit cell comprises a positive electrode current collector layer, a positive electrode active material layer, a solid electrolyte layer, a negative electrode active material layer, and a negative electrode current collector layer laminated in this order.

For example, the cell laminate 10 shown in FIG. 1 comprises four unit cells 6a, 6b, 6c, and 6d. Furthermore, unit cell 6a comprises a positive electrode current collector layer 1a, a positive electrode active material layer 2a, a solid electrolyte layer 3a, a negative electrode active material layer 4a, and a negative electrode current collector layer 5a (5b) laminated in this order. Unit cell 6b comprises a negative electrode current collector layer 5a (5b), a negative electrode active material layer 4b, a solid electrolyte layer 3b, a positive electrode active material layer 2b, and a positive electrode current collector layer 1b (1c) laminated in this order. Unit cell 6c comprises a positive electrode current collector layer 1b (1c), a positive electrode active material layer 2c, a solid electrolyte layer 3c, a negative electrode active material layer 4c, and a negative electrode current collector layer 5c (5d) laminated in this order. Unit cell 6d comprises a negative electrode current collector layer 5c (5d), a negative electrode active material layer 4d, a solid electrolyte layer 3d, a positive electrode active material layer 2d, and a positive electrode current collector layer 1d laminated in this order.

In the present disclosure, the cell laminate may be a monopolar-type cell laminate or may be a bipolar-type cell laminate.

In the case of a monopolar-type cell laminate, two unit cells which are adjacent in the lamination direction may have a monopolar-type structure in which a positive electrode current collector layer or the negative electrode current collector layer is shared. For example, as shown in FIG. 1, adjacent unit cells 6a and 6b share the negative electrode current collector layer 5a (5b), adjacent unit cells 6b and 6c share the positive electrode current collector 1b (1c), and adjacent unit cells 6c and 6d share the negative electrode current collector layer 5c (5d). These unit cells 6a, 6b, 6c, and 6d collectively constitute the monopolar-type laminate 10.

In the case of a bipolar-type cell laminate, two unit cells which are adjacent in the lamination direction may have a bipolar-type structure in which a shared positive electrode/negative electrode current collector layer is used as both the positive electrode and negative electrode current collector layers. Thus, for example, the cell laminate may be a laminate of three unit cells in which a shared positive electrode/negative electrode current collector layer is used as both the positive electrode and negative electrode current collector layers. Specifically, the cell laminate can comprise a positive electrode current collector layer, a positive electrode active material layer, a solid electrolyte layer, a negative electrode active material layer, a positive electrode/negative electrode current collector layer, a positive electrode active material layer, a solid electrolyte layer, a negative electrode active material layer, a positive electrode/negative electrode current collector layer, a positive electrode active material layer, a solid electrolyte layer, a negative electrode active material layer, and a negative electrode current collector layer laminated in this order (not illustrated). Furthermore, in this case, since the "positive electrode/negative electrode current collector layer" can be used as both positive electrode and negative electrode current collector layers, in the present disclosure, the phrase "positive electrode/negative electrode current collector layer" can encompass both a "positive electrode current collector layer" and a "negative electrode current collector layer".

In the present disclosure, at least one of the positive electrode current collector layer, positive electrode active material layer, solid electrolyte layer, negative electrode active material layer, and negative electrode current collector layer comprises extending parts which extend more outwardly from the side surface of the cell laminate than the other layers, and a gap is formed between the extending parts. One or a plurality of layers among the positive electrode current collector layer, positive electrode active material layer, solid electrolyte layer, negative electrode active material layer, and negative electrode current collector layer may include extending parts.

In a laminate-type all-solid-state battery represented by a lithium ion battery, in order for lithium ions released by the positive electrode active material layer during charging to reliably and smoothly move to the negative electrode active material layer, the solid electrolyte layer, the negative electrode active material layer, and the negative electrode current collector layer are preferably formed so as to have surface areas which are larger than those of the positive electrode active material layer and the positive electrode current collector layer. Thus, it is preferable that the solid electrolyte layer, the negative electrode active material layer, and the negative electrode current collector layer include the extending parts.

Furthermore, the all-solid-state battery of the present disclosure may include a positive electrode current collector tab electrically connected to the positive electrode current collector layer and a negative electrode current collector tab electrically connected to the negative electrode current collector layer. In this case, these current collector tabs may protrude from the resin layer. According to this configuration, electrical power generated by the cell laminate can be extracted to the outside via the current collector tabs.

Furthermore, the positive electrode current collector layer may include a positive electrode current collector protruding part that protrudes in the surface direction, and the positive electrode current collector protruding part may be electrically connected with the positive electrode current collector tab. Likewise, the negative electrode current collector layer may include a negative electrode current collector protruding part, and the negative electrode current collector protruding part may be electrically connected to the negative electrode current collector tab.

In the all-solid-state battery of the present disclosure, the cell laminate can be restrained in the lamination direction. As a result, during charging and discharging, the battery reaction can be further improved by improving the conductivity of ions and electrons inside each layer of the cell laminate and between each layer.

Each member of the cell laminate will be described in detail below. In order to facilitate understanding of the present disclosure, each member of the cell laminate of an all-solid-state lithium ion secondary battery will be described as an example. However, the all-solid-state battery of the present disclosure is not limited to lithium ion secondary batteries and can be widely applied.

(Positive Electrode Current Collector Layer)

The conductive material used in the positive electrode current collector layer is not particularly limited and any conductive material which can be used in all-solid-state batteries can be appropriately used. For example, the conductive material used in the positive electrode current collector layer may be SUS, aluminum, copper, nickel, iron, titanium, or carbon. However, the conductive material is not limited thereto.

The form of the positive electrode current collector layer is not particularly limited and can be, for example, a foil, a plate, or a mesh. Among these, a foil is preferable.

(Positive Electrode Active Material Layer)

The positive electrode active material layer includes at least a positive electrode active material, and preferably further includes a solid electrolyte, which is described later. In addition thereto, additives which are used in the positive electrode active material layers of all-solid-state batteries, such as a conductive aid or a binder, can be included in accordance with the intended use or application.

The material of the positive electrode active material is not particularly limited. For example, the positive electrode active material may be lithium cobalt oxide ($LiCoO_2$), lithium nickel oxide ($LiNiO_2$), lithium manganate ($LiMn_2O_4$), $LiCo_{1/3}Ni_{1/3}Mn_{1/3}O_2$ or a heterogeneous-element-substituted Li—Mn spinel represented by $Li_{1+x}Mn_{2-x-y}M_yO_4$ (wherein M is at least one metal element selected from Al, Mg, Co, Fe, Ni and Zn). However, the material of the positive electrode active material layer is not limited thereto.

The conductive aid is not particularly limited. For example, the conductive aid may be a carbon material, such as VGCF (vapor grown carbon fiber) or carbon nanofibers, or a metal material. However, the conductive aid is not limited thereto.

The binder is not particularly limited. For example, the binder may be a material such as polyvinylidene fluoride (PVdF), carboxymethyl cellulose (CMC), butadiene rubber (BR), styrene butadiene rubber (SBR), or combinations thereof. However, the binder is not limited thereto.

(Solid Electrolyte Layer)

The solid electrolyte layer includes at least a solid electrolyte. The solid electrolyte is not particularly limited and any material commonly used as the solid electrolyte in all-solid-state batteries can be used. For example, the solid electrolyte may be a sulfide solid electrolyte, oxide solid electrolyte, or polymeric electrolyte. However, the solid electrolyte is not limited thereto.

Examples of the sulfide solid electrolyte include sulfide-based amorphous solid electrolytes, sulfide-based crystalline solid electrolytes, or aldylodyte-type solid electrolytes. However, the sulfide solid electrolyte is not limited thereto. Examples of specific sulfide solid electrolytes include $Li_2S$—$P_2S_5$-type compounds (such as $Li_7P_3S_{11}$, $Li_3PS_4$, or $Li_8P_2S_9$), $Li_2S$—$SiS_2$, $LiI$—$Li_2S$—$SiS_2$, $LiI$—$Li_2S$—$P_2S_5$, $LiI$ $Liar$ $Li_2S$ $P_2S_5$, $Li_2S$—$P_2S_5$—$GeS_2$ (such as $Li_{13}GeP_3S_{16}$ or $Li_{10}GeP_2S_{12}$), $LiI$ $Li_2S$ $P_2O_5$, $LiI$—$Li_3PO_4$—$P_2S_5$, $Li_{7-x}PS_{6-x}Cl_x$, or combinations thereof. However, the sulfide solid electrolyte is not limited thereto.

Examples of the oxide solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, or $Li_{3+x}PO_{4-x}N_x$ (LiPON). However, the oxide solid electrolyte is not limited to these materials.

(Polymeric Electrolyte)

Examples of the polymeric electrolyte include polyethylene oxide (PEO), polypropylene oxide (PPO), and copolymers thereof. However, the polymeric electrolyte is not limited thereto.

The solid electrolyte may be a glass or a crystallized glass (glass ceramic). Furthermore, in addition to the above-described solid electrolytes, the solid electrolyte layer may include a binder as necessary. Specific examples thereof are the same as the "binders" described above for the "positive electrode active material layer".

(Negative Electrode Active Material Layer)

The negative electrode active material layer includes at least a negative electrode active material and preferably further includes a solid electrolyte as described above. In addition thereto, depending on the purpose or application thereof, for example, additives commonly used in the negative electrode active material layer of all-solid-state batteries, such as a conductive aid or binder, can be included.

The material of the negative electrode active material is not particularly limited. The material is preferably capable of occluding and releasing metal ions such as lithium ions. For example, the negative electrode active material may be an alloy-based negative electrode active material or a carbon material. However, the material of the negative electrode active material layer is not limited thereto.

The alloy-based negative electrode active material is not particularly limited, and, for example, a Si alloy-based negative electrode active material or a Sn alloy-based negative electrode active material can be used. However, the alloy-based negative electrode active material is not limited thereto.

The Si alloy-based negative electrode active material can be silicon, silicon oxide, silicon carbide, silicon nitride, or a solid solution thereof. Furthermore, the Si alloy-based negative electrode active material can include an element other than silicon, such as Fe, Co, Sb, Bi, Pb, Ni, Cu, Zn, Ge, In, Sn, or Ti.

The Sn alloy-based negative electrode active material can be tin, tin oxide, tin nitride, or a solid solution thereof. Furthermore, the Sn alloy-based negative electrode active material can include an element other than tin, such as Fe, Co, Sb, Bi, Pb, Ni, Cu, Zn, Ge, In, Ti, or Si.

Among the examples of the alloy-based negative electrode active material included in the negative electrode active material layer described above, the alloy-based negative electrode active material preferably includes a Si alloy-based negative electrode active material.

The carbon material is not particularly limited and can be, for example, a hard carbon, a soft carbon, or graphite.

Regarding the solid electrolyte and other additives such as the conductive aid and binder used in the negative electrode active material layer, those described above in the sections "positive electrode active material layer" and "solid electrolyte layer" can be appropriately used.

(Negative Electrode Current Collector Layer)

The conductive material used in the negative electrode current collector layer is not particularly limited, and any material commonly used in all-solid-state batteries can be appropriately used. For example, the conductive material used in the negative electrode current collector layer may be SUS, aluminum, copper, nickel, iron, titanium, or carbon. However, the conductive material is not limited thereto.

The form of the negative electrode current collector layer is not particularly limited and can be, for example, a foil, a plate, or a mesh. Among these, a foil is preferable.

In the present disclosure, the cell laminate may be restrained in the lamination direction after the side surface thereof is covered with the resin layer, which is described later. Furthermore, by restraining the cell laminate, the side surface of which has been covered with a resin layer, during charging and discharging, the battery reaction can be further improved by improving the conductivity of ions and electrons inside each layer of the cell laminate and between each layer.

The restraint pressure of the restraint by which the cell laminate, the side surface of which is covered with a resin layer, is restrained is not particularly limited and may be, for example, 1.0 MPa or more, 1.5 MPa or more, 2.0 MPa or more, or 2.5 MPa or more. The upper limit of the restraint pressure is not particularly limited and may be, for example, 50 MPa or less.

<Resin Layer>

In the present disclosure, the material of the resin layer indispensably includes a resin material and may include, for example, an inorganic filler as necessary.

(Resin Material)

The resin constituting the resin layer may be a curable resin or a thermoplastic resin. Furthermore, the curable resin may be a thermosetting resin, a photocurable resin (such as a UV-curable resin), or an electron-beam-curable resin. More specifically, the material of the resin layer may be an epoxy resin, a silicone resin, an acrylic resin, a polyimide resin, a polyester resin, a polypropylene resin, a polyamide resin, a polystyrene resin, a polyvinyl chloride resin, or a polycarbonate resin. However, the resin material is not limited thereto.

Among the resin materials described above, if it is necessary to relatively raise the compressive modulus of the resin layer, for example, an epoxy resin can be used. Conversely, if it is necessary to relatively reduce the compressive modulus of the resin layer, for example, a silicone resin can be used.

(Inorganic Filler)

The material used in the inorganic filler is not particularly limited as long as it can be stably used in the all-solid-state battery. For example, an oxide (such as alumina ($Al_2O_3$), silica ($SiO_2$), titania ($TiO_2$), zirconia ($ZrO_2$), or $CeO_2$, $Y_2O_3$, $La_2O_3$, $LiAlO_2$, $Li_2O$, BeO, $B_2O_3$, $Na_2O$, MgO, $P_2O_5$, CaO, $Cr_2O_3$, $Fe_2O_3$, or ZnO), a porous composite ceramic (such as zeolite, sepiolite, or palygorskite), a nitride (such as $Si_3N_4$, BN, AlN, TiN, or $Ba_3N_2$), a carbide (such as SiC, ZrC, or $B_4C$), a carbonate (such as $MgCO_3$ or $CaCO_3$), or a sulfate (such as $CaSO_4$ or $BaSO_4$) can be used as the inorganic filler. However, the inorganic filler is not limited thereto. Furthermore, one of these materials used in the inorganic filler may be used, or two or more may be combined.

The form of the inorganic filler is not particularly limited and may be spherical, elliptical, fiber-like, or scale-like.

In the present disclosure, the resin layer covers the side surface of the cell laminate. As a result, the exterior of the all-solid-state battery of the present disclosure may not include an exterior body such as a laminate film or a metal can. Thus, the all-solid-state battery of the present disclosure is more compact than conventional all-solid-state batteries, which require an exterior body, and the all-solid-state battery of the present disclosure leads to an improvement in the energy density of the battery. However, one embodiment of the present disclosure may further include such an exterior body.

Furthermore, in the all-solid-state battery of the present disclosure, the upper end surface and the lower end surface of the cell laminate in the lamination direction may be covered with a film or the like, and at least the side surface of the cell laminate may be covered with the resin layer. Furthermore, in the all-solid-state battery of the present disclosure, the upper end surface and/or the lower end surface of the cell laminate in the lamination direction may also be covered with the resin layer.

<<All-Solid-State Battery Type>>

In the present disclosure, the all-solid-state battery may be an all-solid-state lithium ion battery, an all-solid-state sodium ion battery, an all-solid-state magnesium ion battery, or an all-solid-state calcium ion battery. Among these, an all-solid-state lithium ion battery or an all-solid-state sodium ion battery is preferable, and an all-solid-state lithium ion battery is particularly preferable.

Furthermore, the all-solid-state battery of the present disclosure may be a primary battery or may be a secondary battery. Among these, a secondary battery is preferable. Secondary batteries can be repeatedly charged and discharged, and are used as, for example, vehicle batteries.

Thus, the all-solid-state battery of the present disclosure is preferably an all-solid-state lithium ion secondary battery.

<<All-Solid-State Battery Production Method>>

The present disclosure also provides a method for producing the all-solid-state battery described above. In the method of the present disclosure shown below, an explanation of the portions which are shared with the explanation of the all-solid-state battery above have been omitted.

The method for producing the all-solid-state battery of the present disclosure includes the following steps of:
(a) preparing the cell laminate,
(b) forming the resin layer on the side surface of the cell laminate, and
(c) restraining the cell laminate, which is covered with the resin layer, in the lamination direction.

Figure 2A:
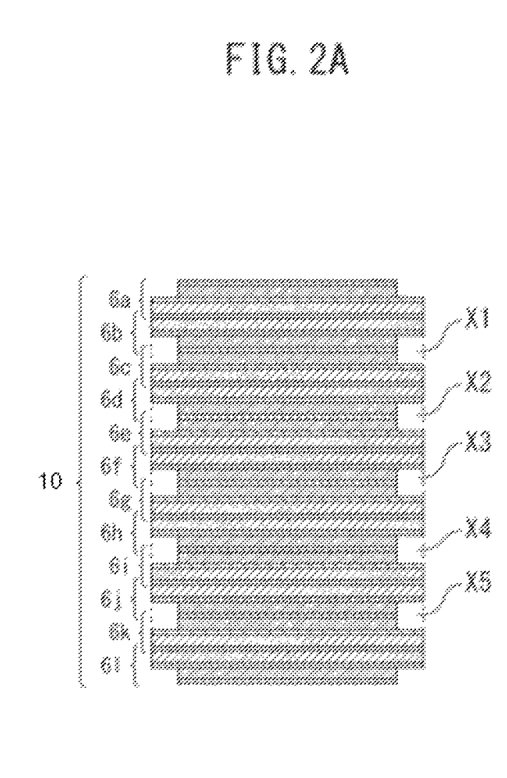
FIGS. 2A to 2C are schematic cross-sectional views showing an aspect of the method of the present disclosure for producing an all-solid-state battery.
Figure 2B:
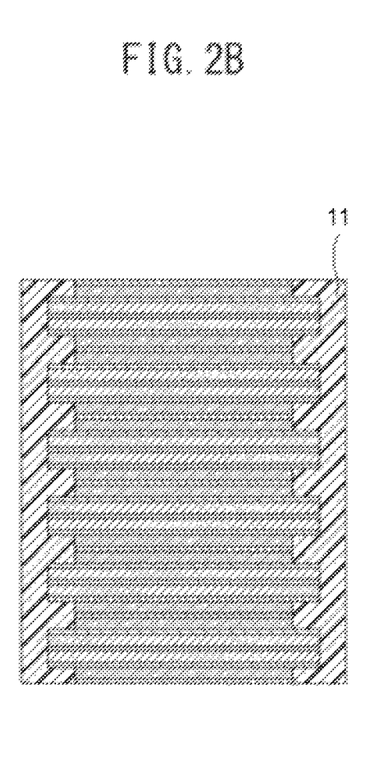
Figure 2C:
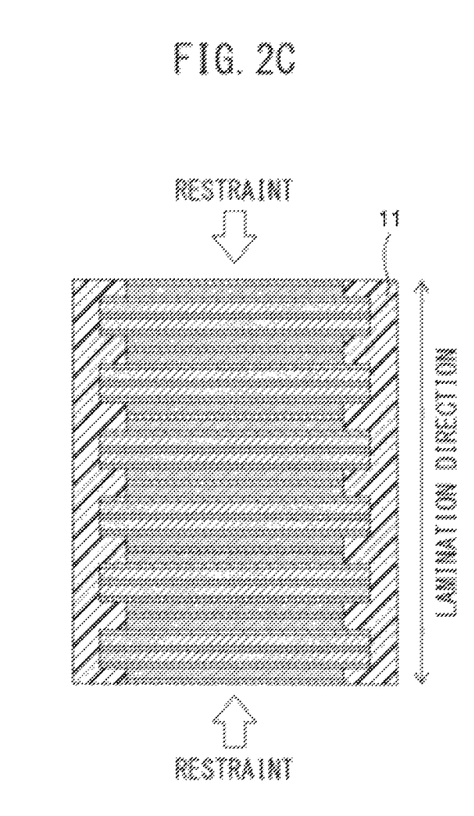

For example, FIGS. 2A to 2C are schematic cross-sectional views showing an aspect of the method of the present disclosure for producing an all-solid-state battery. Each of the steps included in the method of the present disclosure will be described below using FIGS. 2A to 2C.

<Step (a)>

In step (a), a cell laminate is prepared. The details of the structure of the cell laminate are as described above and an explanation thereof has been omitted.

FIG. 2A shows an aspect of step (a). More specifically, in FIG. 2A shows an aspect in which a monopolar-type cell laminate 10 comprising 11 unit cells 6a to 6l has been prepared.

Each of the unit cells 6a to 6l comprises a positive electrode current collector layer, a positive electrode active material layer, a solid electrolyte layer, a negative electrode active material layer, and a negative electrode current collector layer laminated in this order, and the solid electrolyte layer, the negative electrode active material layer, and the negative electrode current collector layer comprise extending parts which extend more outwardly from the side surface of the cell laminate 10 than the positive electrode current collector layer and the positive electrode active material layer, and gaps X1 to X5 are formed between the extending parts. Regarding the details of the structures of the unit cells, refer to the description of the unit cells of the cell laminate 10 above.

<Step (b)>

In step (b), a resin layer is formed on the side surface of the cell laminate.

The method for forming the resin layer is not particularly limited, and the resin layer can be formed on the side surface of the cell laminate by applying a liquid resin layer material to the side surface of the cell laminate (including in the gaps between the extending parts) by a method such as, for example, a capillary underfill method, an injection molding method, a transfer molding method, or a dip-molding method, and then curing the resin.

The resin need not necessarily be liquid at room temperature and a resin which is melted by heating may be used. The conditions for curing the resin can be appropriately determined in accordance with the type of resin used.

FIG. 2B shows an aspect after step (b) has been performed. In other words, FIG. 2B shows an aspect in which the resin layer 11 has been formed on the side surface of the cell laminate 10, including in the gaps X1 to X5 between the extending parts.

(Step (c))

In step (c), the cell laminate, which is covered with the resin layer, is restrained in the lamination direction.

FIG. 2C shows an aspect of step (c). More specifically, FIG. 2C shows an aspect in which the cell laminate 10, which is covered with the resin layer 11, is restrained in the lamination direction.

In step (c), the restraint pressure of the restraining is not particularly limited and may be, for example, 1.0 MPa or more, 1.5 MPa or more, 2.0 MPa or more, 2.5 MPa or more, 3.0 MPa or more, 5.0 MPa or more, 7.0 MPa or more, 9.0 MPa or more, or 10 MPa or more. The upper limit of the restrain pressure is not particularly limited and may be, for example, 50 MPa or less, 40 MPa or less, 30 MPa or less, 20 MPa or less, or 10 MPa or less.

EXAMPLES

The present disclosure will be described in further detail with reference to the Examples shown below. However, the scope of the present disclosure is not limited by the Examples.

Examples and Comparative Examples

Using the following materials, the all-solid-state batteries of Examples 1 to 3 and Comparative Examples 1 and 2 were produced by preparing cell laminates 10 having the lamination structure shown in FIG. 1, covering the side surface thereof with resin layers 11, and restraining at a restraint pressure of 10 MPa.

Positive Electrode Current Collector Layer: Aluminum Collector Foil (thickness: 15 μm)
Positive Electrode Active Material Layer: Positive Electrode Active Material+Sulfide Solid Electrolyte+Conductive Aid+Binder (thickness: 40 μm)
Positive Electrode Active Material: $LiCo_{1/3}Ni_{1/3}Mn_{1/3}O_2$
Sulfide Solid Electrolyte: $Li_2S$—$P_2S_5$—$LiI$—$LiBr$
Conductive Aid: Vapor Grown Carbon Fiber (VGCF)
Binder: Polyvinylidene Fluoride (PVdF)
Solid Electrolyte Layer: Sulfide Solid Electrolyte+Binder (thickness: 30 μm)
Sulfide Solid Electrolyte: $Li_2S$—$P_2S_5$—$LiI$—$LiBr$
Binder: Styrene Butadiene Rubber (SBR)
Negative Electrode Active Material Layer: Si Alloy-Based Negative Electrode Active Material+Sulfide Solid Electrolyte+Binder (thickness: 60 μm)
Sulfide Solid Electrolyte: $Li_2S$—$P_2S_5$—$LiI$—$LiBr$
Binder: Polyvinylidene Fluoride (PVdF)
Positive Electrode/Negative Electrode Current Collector Layer: SUS Collector Foil (thickness: 15 μm)

Regarding the resin material constituting the resin layer, in Examples 1 to 3, a silicone resin was used, and in Comparative Examples 1 and 2, an epoxy resin was used. In order to adjust the relationships of the compressive moduli of the cell laminates, an appropriate filler was added.

Furthermore, the compressive moduli of the cell laminates were obtained in accordance with the JIS standards (JIS R1644:2002), and were 5.0 GPa.

The compressive moduli of the resin layers of the Examples and the Comparative Examples were obtained in accordance with the JIS standards (JIS A9511:1999). The results are shown in Table 1.

Charging and discharging of samples of the all-solid-state batteries of the Examples and the Comparative Examples produced as described above were repeated ten times, and the presence or absence of cracking in the resin layers and the extending parts of the cell laminates was examined by X-ray CT imaging. The results are shown in Table 1.

TABLE 1

|  | Ex. 1 | Ex. 2 | Ex. 3 | Comp. Ex. 1 | Comp. Ex. 2 |
|---|---|---|---|---|---|
| Compressive Modulus of Resin Layer (GPa) | 0.1 | 1.0 | 2.0 | 3.0 | 5.0 |
| Compressive Modulus of Cell Laminate (GPa) | 5.0 | 5.0 | 5.0 | 5.0 | 5.0 |
| Ratio of Compressive Moduli of Resin Layer/Cell Laminate | 0.02 | 0.2 | 0.4 | 0.6 | 1.0 |
| Cracking After Charging/Discharging | No | No | No | Yes | Yes |

As is obvious from the results of Table 1, in the all-solid-state batteries of the present disclosure of Examples 1 to 3, in which the ratios of the compressive modulus of the resin layer to the compressive modulus of the cell laminate were 0.4 or less, cracking did not occur in the resin layers or the extending parts of the cell laminates after charging and discharging. Conversely, in the all-solid-state batteries of Comparative Examples 1 and 2, in which the ratios of the compressive modulus of the resin layer to the compressive modulus of the cell laminate were 0.6 and 1.0, respectively, cracking was observed in not only the resin layer but also in the extending parts of the cell laminates.

REFERENCE SIGNS LIST 1a, 1b, 1c, 1d positive electrode current collector layer
2a, 2b, 2c, 2d positive electrode active material layer
3a, 3b, 3c, 3d solid electrolyte layer
4a, 4b, 4c, 4d negative electrode active material layer
5a, 5b, 5c, 5d negative electrode current collector layer
6a, 6b, 6c, 6d, 6e, 6f, 6g, 6h, 6i, 6j, 6k, 6l unit cell
10 cell laminate
11 resin layer
30b extending part
30c extending part
100 all-solid-state battery

What is claimed:

1. A method for producing an all-solid-state battery, wherein the all-solid-state battery comprises:
   a cell laminate including two or more unit cells, and
   a resin layer covering a side surface of the cell laminate,
   wherein each unit cell comprises a positive electrode current collector layer, a positive electrode active material layer, a solid electrolyte layer, a negative electrode active material layer, and a negative electrode current collector layer laminated in this order,
   wherein at least one of the positive electrode current collector layer, positive electrode active material layer, solid electrolyte layer, negative electrode active material layer, and negative electrode current collector layer includes extending parts which extend more outwardly from the side surface of the cell laminate than the other layers, and a gap is formed between the extending parts,
   wherein a ratio of a compressive modulus of the resin layer to a compressive modulus of the cell laminate is 0.4 or less, and
   wherein the cell laminate is restrained in a lamination direction, and
   wherein the method comprises the following steps of:
   (a) preparing the cell laminate,
   (b) forming the resin layer on the side surface of the cell laminate, and
   (c) restraining the cell laminate, which has been covered with the resin layer, in the lamination direction,
   wherein in the step (b), the resin layer is formed on the side surface of the cell laminate by applying a liquid resin layer material to the side surface of the cell laminate including in the gaps between the extending parts, and
   wherein a material of the resin layer comprises a silicone resin.

2. The method according to claim 1, wherein a restraining pressure of the restraint is 1.0 MPa or more.

3. The method according to claim 1, wherein the negative electrode active material layer comprises an alloy-based negative electrode active material.

4. The method according to claim 3, wherein the alloy-based negative electrode active material comprises a Si alloy-based negative electrode active material.

5. The method according to claim 1, wherein the material of the resin layer comprises a curable resin or a thermoplastic resin.

6. The method according to claim 1, wherein the all-solid-state battery is an all-solid-state lithium secondary battery.

* * * * *